(12) United States Patent  
Braun et al.

(10) Patent No.: US 8,403,089 B2
(45) Date of Patent: Mar. 26, 2013

(54) USE OF FAN SHROUD TO VENTILATE ENGINE COMPARTMENT

(75) Inventors: Kevin G. Braun, Dubuque, IA (US); Steven R. Sass, Dubuque, IA (US); Andrew J. Quinn, Peosta, IA (US)

(73) Assignee: Deere & Company, Moline, IL (US)

( * ) Notice: Subject to any disclaimer, the term of this patent is extended or adjusted under 35 U.S.C. 154(b) by 1127 days.

(21) Appl. No.: 12/342,587

(22) Filed: Dec. 23, 2008

(65) Prior Publication Data

US 2010/0155013 A1  Jun. 24, 2010

(51) Int. Cl.
*B60K 11/00* (2006.01)
(52) U.S. Cl. .................. 180/68.1; 180/68.2; 180/68.4
(58) Field of Classification Search ........ 180/68.1–68.4, 180/68.6, 291, 296, 309
See application file for complete search history.

(56) References Cited

U.S. PATENT DOCUMENTS

| 2,708,920 | A | * | 5/1955 | Pasturczak | 123/198 E |
|---|---|---|---|---|---|
| 4,086,976 | A | * | 5/1978 | Holm et al. | 180/68.1 |
| 4,339,014 | A | * | 7/1982 | Berth et al. | 180/68.1 |
| 4,371,047 | A | * | 2/1983 | Hale et al. | 180/68.1 |
| 4,382,481 | A | * | 5/1983 | Moore | 180/68.1 |
| 4,454,926 | A | * | 6/1984 | Akins | 180/68.1 |
| 5,427,502 | A | | 6/1995 | Hudson | |
| 5,692,467 | A | * | 12/1997 | Sahm et al. | 123/198 E |
| 5,887,671 | A | * | 3/1999 | Yuki et al. | 180/68.1 |
| 7,188,599 | B2 | * | 3/2007 | Chaney et al. | 123/198 E |
| 7,418,994 | B2 | | 9/2008 | Evans et al. | |
| 7,478,993 | B2 | * | 1/2009 | Hong et al. | 415/211.2 |
| 8,104,559 | B2 | * | 1/2012 | Kisse | 180/68.1 |
| 2005/0252635 | A1 | * | 11/2005 | Adamson et al. | 165/41 |

* cited by examiner

*Primary Examiner* — J. Allen Shriver, II
*Assistant Examiner* — Travis Coolman
(74) *Attorney, Agent, or Firm* — Faegre Baker Daniels

(57) ABSTRACT

A method and apparatus to ventilate an engine compartment of a vehicle.

19 Claims, 5 Drawing Sheets

USE OF FAN SHROUD TO VENTILATE ENGINE COMPARTMENT

FIELD OF THE INVENTION

The present disclosure relates to engine cooling systems. More particularly, the present disclosure relates to fan shrouds used in engine cooling systems to ventilate an engine compartment of a vehicle.

BACKGROUND OF THE INVENTION

Utility vehicles, such as tractors, motor graders, bulldozers, and skidders, are powered by internal combustion engines. Internal combustion engines generate a significant amount of heat during operation. To cool and protect the engine, engine cooling systems are provided. The engine cooling system may include a fan, a radiator, and liquid coolant. In operation, liquid coolant flows through the engine block to absorb heat from the engine. Then, the heated liquid coolant travels through the radiator while the fan directs cool, ambient air across the radiator to cool the liquid coolant. Finally, the cooled liquid coolant leaving the radiator is recirculated through the engine block.

SUMMARY

The present disclosure provides a method and apparatus to ventilate an engine compartment of a vehicle.

According to an embodiment of the present disclosure, a vehicle is provided including a chassis, at least one ground engaging mechanism configured to propel the chassis over the ground, an engine operatively coupled to the at least one ground engaging mechanism to power propulsion of the chassis, a baffle defining a vent aperture, and a cooling system separated from the engine by the baffle. The cooling system includes a heat exchanger, a shroud having an outer periphery that defines an opening, an inlet, and an outlet, the outer periphery of the shroud including a suction aperture in communication with the vent aperture of the baffle, and a fan received in the opening of the shroud for rotation therein, the fan being configured to draw air into the inlet of the shroud and into the suction aperture of the shroud, and also being configured to discharge air from the outlet of the shroud.

According to another embodiment of the present disclosure, a vehicle is provided including a chassis, at least one ground engaging mechanism configured to propel the chassis over the ground, an engine operatively coupled to the at least one ground engaging mechanism to power propulsion of the chassis, a heat exchanger coupled to the engine for cooling the engine, and a fan assembly. The fan assembly includes a first inlet configured to draw air across the heat exchanger and into the fan assembly, a second inlet configured to draw air across the engine and into the fan assembly, and an outlet configured to discharge air drawn into the fan assembly through the first and second inlets.

According to yet another embodiment of the present disclosure, a method is provided to ventilate an engine compartment of a vehicle. The method includes the steps of: providing a vehicle including an engine and a heat exchanger; directing a first air stream across the heat exchanger to cool the heat exchanger; directing a second air stream across the engine to cool the engine; combining the first and second air streams to produce a third air stream; and exhausting the third air stream from the vehicle.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
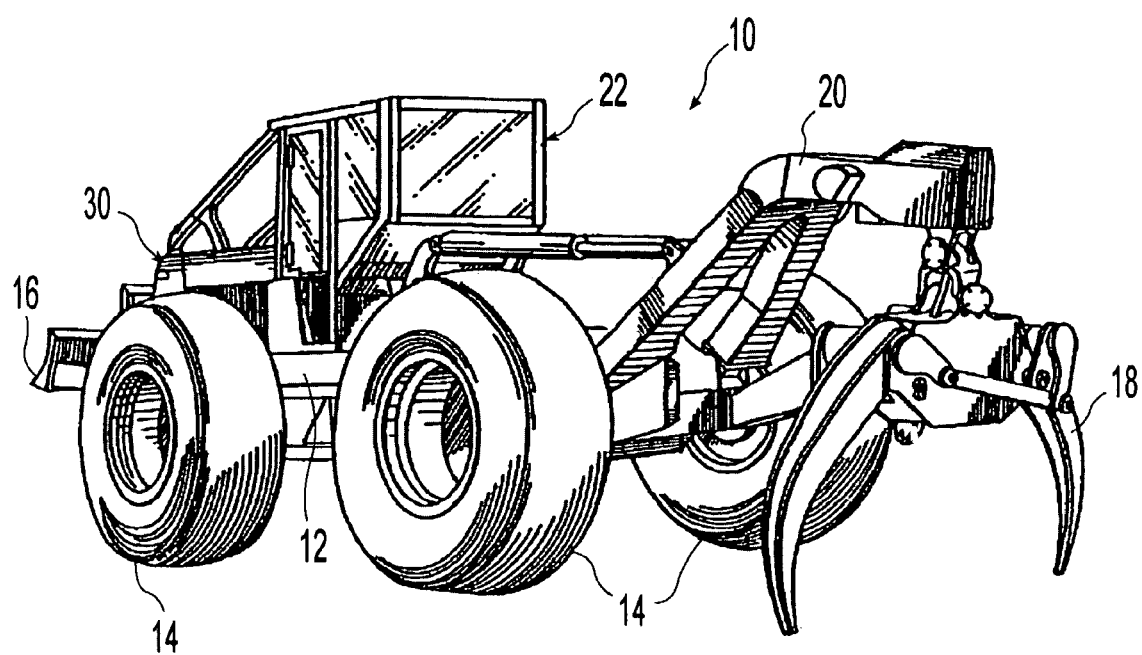
FIG. 1 is a rear perspective view of an embodiment of a utility vehicle.

Referring to FIG. 1, a utility vehicle in the form of skidder 10 is illustrated. Although the vehicle is illustrated and described herein as skidder 10, the utility vehicle may include a motor grader, a tractor, a bulldozer, or another utility vehicle. Skidder 10 includes chassis 12 and ground engaging mechanism 14. Ground engaging mechanism 14 may be capable of supporting chassis 12 and propelling chassis 12 across the ground. Although the illustrated skidder 10 includes wheels as ground engaging mechanism 14, skidder 10 may include tracks, such as steel tracks or rubber tracks. Skidder 10 also includes multiple work tools, specifically a front-mounted blade 16 and a rear-mounted grapple 18 coupled to chassis 12 via grapple linkage 20. Both blade 16 and grapple 18 are configured to move relative to chassis 12 to move material. For example, blade 16 may be used for leveling dirt and other materials and pushing over trees, and grapple 18 may be used for pulling tree stumps. The utility vehicle may be provided with other work tools, such as a bucket, a pallet fork, a bail lift, an auger, a harvester, a tiller, or a mower, for example. Skidder 10 further includes operator cab 22. Operator cab 22 is provided with controls (not shown) to operate skidder 10 and protects the operator.

Figure 2:
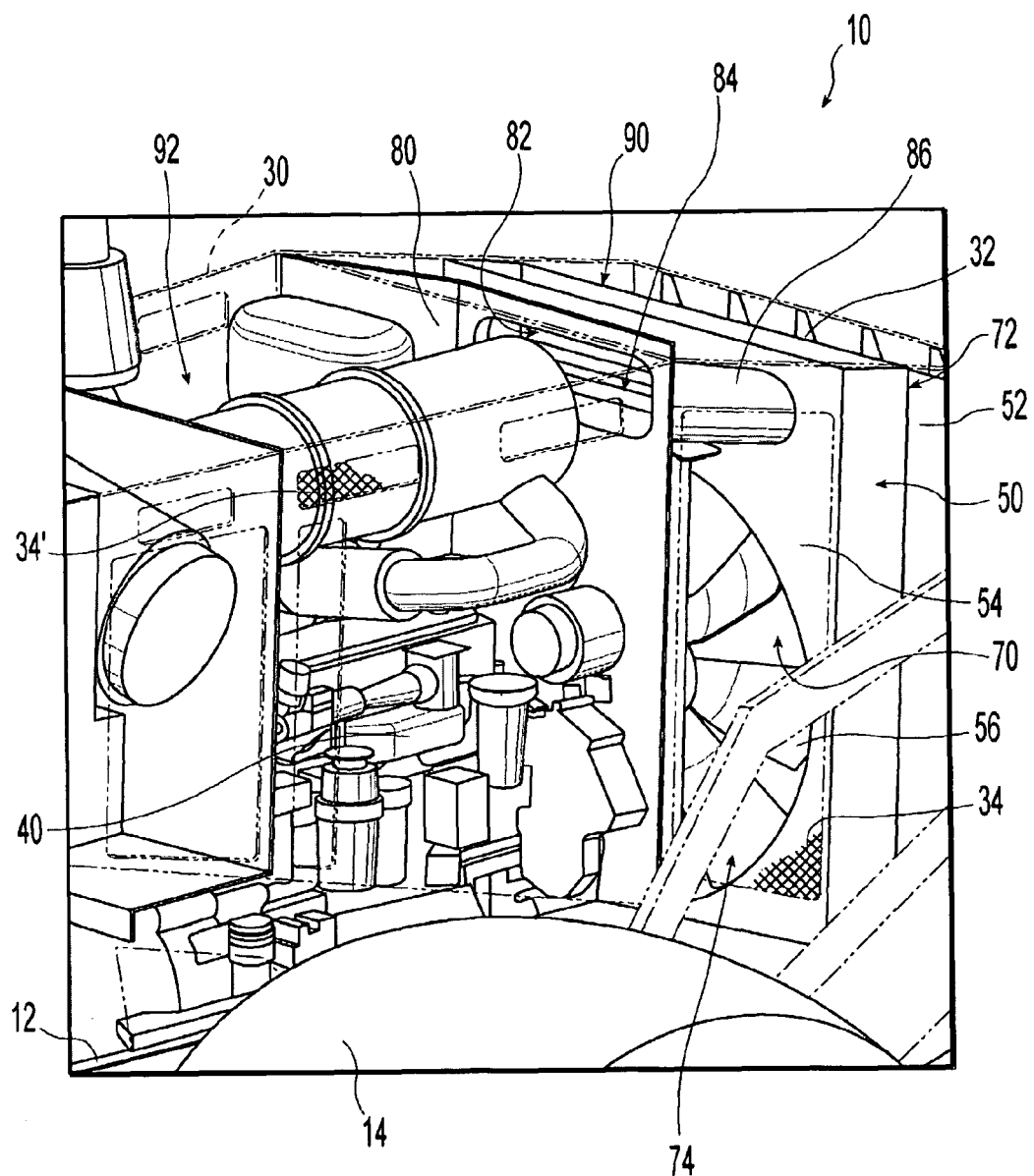
FIG. 2 is a perspective view of an embodiment of an engine cooling system.
Figure 3:
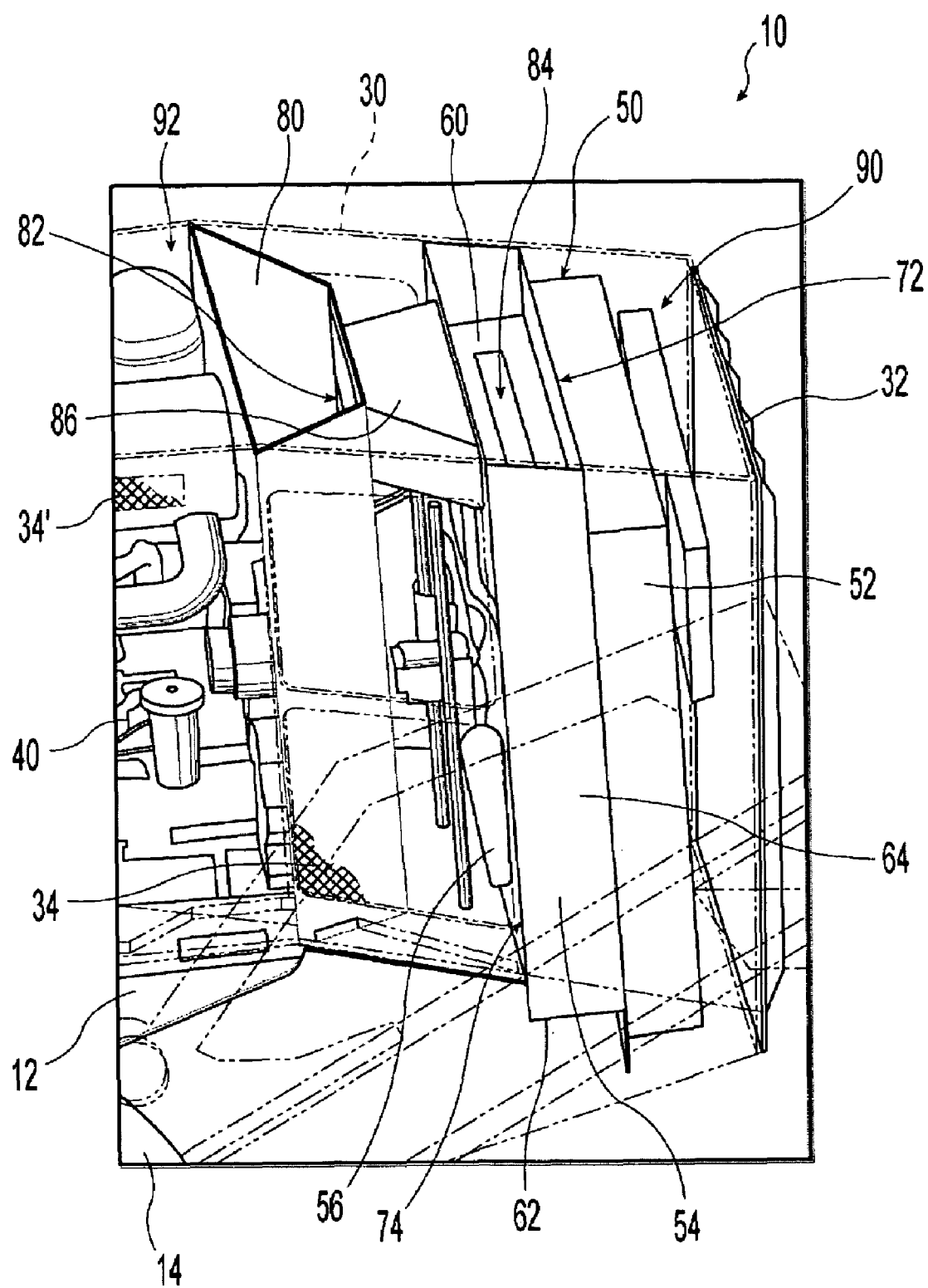
FIG. 3 is another perspective view of the engine cooling system of FIG. 2.

Referring next to FIGS. 2 and 3, the front end of skidder 10 includes hood 30 (shown in phantom) to enclose and protect internal combustion engine 40 and other vehicle components, including, for example, a charge air cooling system, a hydraulic system, a transmission system, an after-treatment system, and/or an exhaust system including a muffler. Hood 30 is supported by chassis 12. Hood 30 may be a one-piece or multi-piece structure and may be constructed of metal, a polymer, or another suitable material. Hood 30 may include a hinged door (not shown) to provide access to internal combustion engine 40. At least some walls of hood 30 may be screened or vented to permit airflow into and out of hood 30. For example, hood 30 may include front grill 32 that is vented to permit airflow into and out of the front end of skidder 10. Hood 30 may also include side grills 34, 34', that are vented to permit airflow into and out of the sides of skidder 10.

The vehicle components under hood 30, including internal combustion engine 40, may generate a significant amount of heat during operation. To cool these components, hood 30 also encloses and protects cooling system 50. Cooling system 50 includes at least one heat exchanger, such as radiator 52, which is provided to cool internal combustion engine 40. Cooling system 50 may also include, for example, a heat exchanger for cooling the hydraulic system and a heat exchanger for cooling the transmission system. These various heat exchangers may be combined into an assembly. The illustrated cooling system 50 also includes fan shroud 54 and fan 56 at least partially surrounded by fan shroud 54. The components of cooling system 50 may be supported by chassis 12 or hood 30, for example. As shown in FIG. 3, front grill 32 of hood 30 is positioned upstream of radiator 52; radiator 52 is positioned upstream of fan shroud 54 and fan 56; and fan shroud 54 and fan 56 are positioned upstream of internal combustion engine 40.

Figure 4:
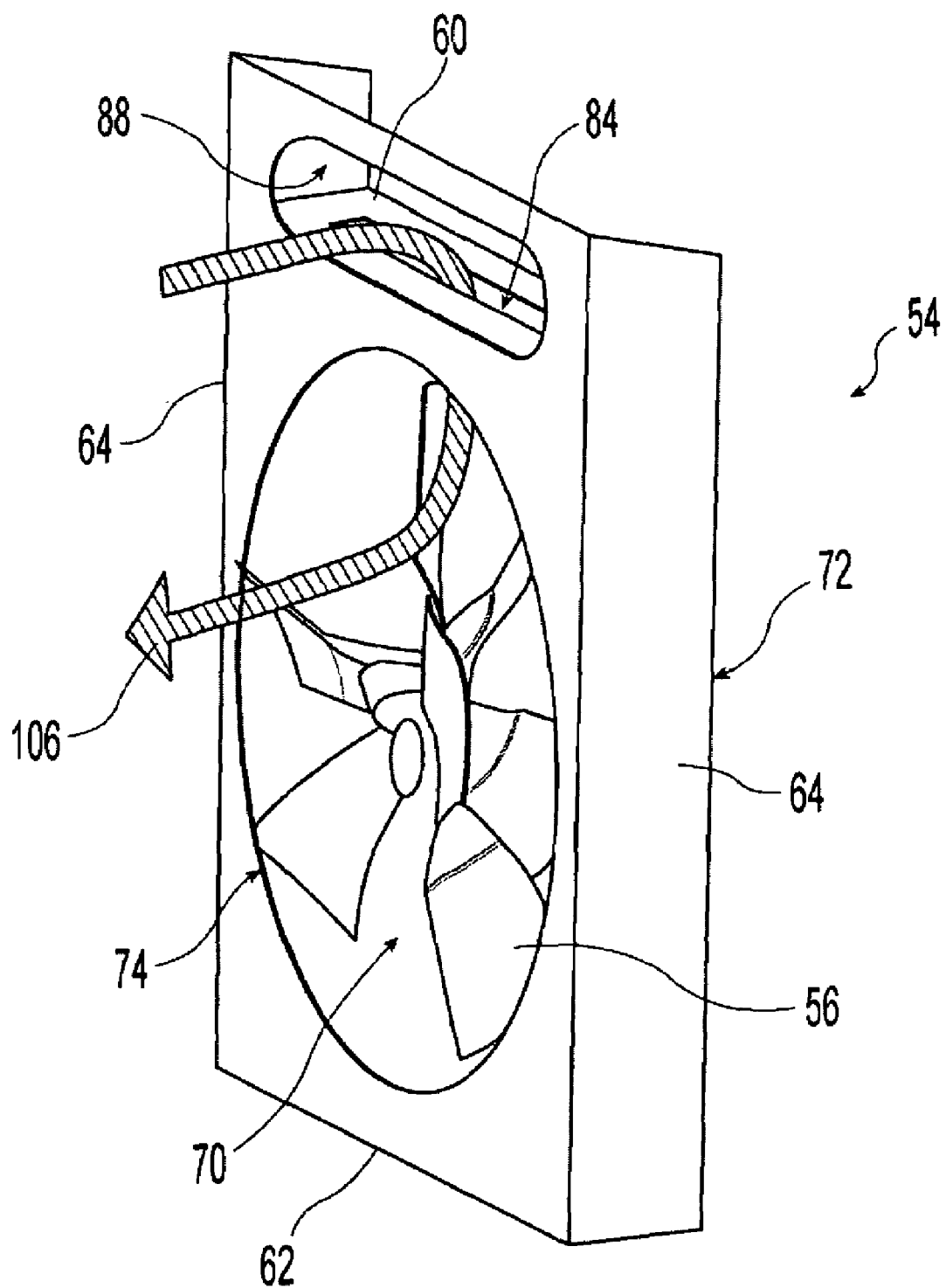
FIG. 4 is a perspective view of a fan and a fan shroud of the engine cooling system of FIGS. 2 and 3.
Figure 5:
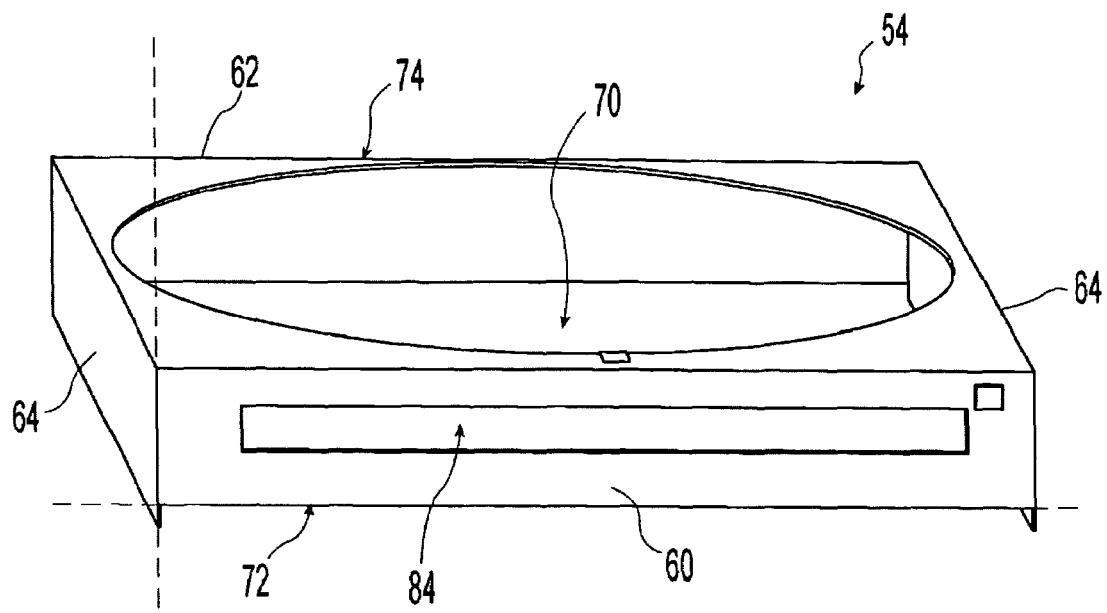
FIG. 5 is a top perspective view of the fan shroud of FIG. 4.

Referring next to FIGS. 4 and 5, an exemplary fan shroud 54 is a generally hollow, box-shaped structure. Fan shroud 54 may be molded or formed from a polymeric material, such as reinforced polypropylene, metal, such as sheet metal, or another suitable material. Fan shroud 54 includes top wall 60, bottom wall 62, and side walls 64. Top wall 60, bottom wall 62, and side walls 64, of fan shroud 54 cooperate to define central opening 70 that extends through fan shroud 54.

Referring back to FIGS. 2 and 3, fan 56 is positioned in central opening 70 of fan shroud 54 and is capable of rotating therein. Fan 56 may be driven by internal combustion engine 40, or fan 56 may be electrically or hydraulically powered, for example. When fan 56 rotates in central opening 70 of fan shroud 54, air is suctioned into inlet 72 of fan shroud 54 and discharged from outlet 74 of fan shroud 54. The location of inlet 72 and outlet 74 of fan shroud 54 may vary depending on the direction of rotation of fan 56. According to an exemplary embodiment of the present disclosure, fan 56 is rotated such that inlet 72 of fan shroud 54 faces front grill 32 of hood 30 and radiator 52, and outlet 74 of fan shroud 54 faces internal combustion engine 40, as shown in FIG. 3.

In operation, heat transfer fluids absorb heat from various heat-generating vehicle components. The heat transfer fluids then travel through heat exchangers for cooling. For example, hydraulic oil absorbs heat from the hydraulic system of the vehicle and travels through a heat exchanger for cooling. Also, liquid coolant absorbs heat from internal combustion engine 40 and travels through radiator 52 for cooling. Fan 56 rotates in fan shroud 54 to pull cool, ambient air across these heat exchangers, including radiator 52. Specifically, fan 56 rotates in fan shroud 54 to pull cool, ambient air into front grill 32 of hood 30, across radiator 52, and into inlet 72 of fan shroud 54. According to an exemplary embodiment of the present disclosure, radiator 52 may be sealed to hood 30 and to fan shroud 54 so that essentially all of the incoming air is directed across radiator 52 and into fan shroud 54. The cool, ambient air traveling across radiator 52 carries heat away from the liquid coolant in radiator 52. The cooled liquid coolant leaving radiator 52 is then recirculated through internal combustion engine 40. The heated air carried across radiator 52 is blown from outlet 74 of fan shroud 54 toward internal combustion engine 40.

To prevent the heated air carried across the heat exchangers from flowing over internal combustion engine 40, hood 30 of skidder 10 may be provided with baffle 80. As shown in FIGS. 2 and 3, baffle 80 is located between fan shroud 54 and internal combustion engine 40 and divides hood 30 into a forward, heat exchanger or radiator compartment 90 and a rear, engine compartment 92. Baffle 80 may be sized and shaped to provide an air barrier between radiator compartment 90 of hood 30 and engine compartment 92 of hood 30. For example, baffle 80 may be sealed to the walls of hood 30. In operation, heated air carried across radiator 52 may be prevented from flowing beyond baffle 80 and into engine compartment 92 of hood 30. Instead, the heated air may escape from radiator compartment 90 of hood 30 via side grill 34 or other vented portions of hood 30, for example.

Although baffle 80 may prevent heated air from flowing into engine compartment 92 of hood 30, baffle 80 may also trap heat generated by internal combustion engine 40 in engine compartment 92 of hood 30. Some heat may escape from engine compartment 92 of hood 30 via side grill 34' or other vented portions of hood 30, for example.

To further ventilate engine compartment 92 of hood 30, baffle 80 may include at least one vent aperture 82 and fan shroud 54 may include suction aperture 84 in communication with vent aperture 82. According to an exemplary embodiment of the present disclosure, vent aperture 82 in baffle 80 is located proximate to suction aperture 84 in fan shroud 54. Vent aperture 82 and suction aperture 84 may have an elongate shape or another suitable shape that permits air flow therethrough. For example, an exemplary suction aperture 84 in fan shroud 54 may extend substantially the entire length of fan shroud 54. Depending on the size of fan shroud 54, suction aperture 84 in fan shroud 54 may have a length of approximately 20 inches, 30 inches, or more, for example. Suction aperture 84 in fan shroud 54 may have a width of approximately 1 inch, 2 inches, or more, for example.

According to an exemplary embodiment of the present disclosure, skidder 10 includes duct or chamber 86 extending between baffle 80 and fan shroud 54. Specifically, skidder 10 includes chamber 86 extending between vent aperture 82 in baffle 80 and suction aperture 84 in fan shroud 54. As shown in FIG. 4, fan shroud 54 may include duct aperture 88, if necessary, to accommodate chamber 86.

Referring to FIGS. 3 and 4, suction aperture 84 is provided in the outer periphery of fan shroud 54. For example, suction aperture 84 may be formed in top wall 60, bottom wall 62, and/or side walls 64 of fan shroud 54. Similarly, vent aperture 82 may be formed near a top end, bottom end, or the sides, of baffle 80 in communication with suction aperture 84. In the illustrated embodiment, suction aperture 84 is formed in top wall 60 of fan shroud 54, and vent aperture 82 is formed near a top end of baffle 80 and is located proximate to suction aperture 84 in top wall 60 of fan shroud 54. Also, suction aperture 84 in top wall 60 extends in a direction that is substantially transverse to inlet 72 and outlet 74 of fan shroud 54. As shown in FIG. 4, suction aperture 84, inlet 72, and outlet 74 communicate with central opening 70 of fan shroud 54.

Figure 6:
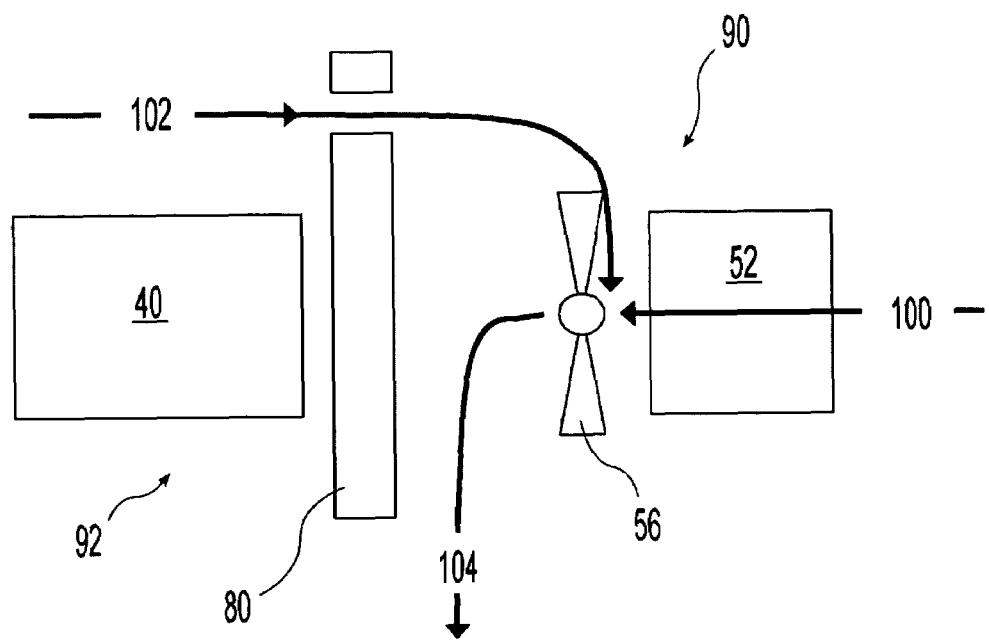
FIG. 6 is a schematic diagram illustrating an exemplary engine cooling system of the present disclosure.

In operation, fan 56 rotates to pull air into inlet 72 of fan shroud 54. As discussed above, fan 56 pulls ambient air across radiator 52. The airflow across radiator 52 in radiator compartment 90 is represented schematically by arrow 100 in FIG. 6. Additionally, fan 56 removes air from engine compartment 92 of hood 30 by pulling air through vent aperture 82 in baffle 80, through chamber 86, and through suction aperture 84 in fan shroud 54. The airflow across internal combustion engine 40 and through baffle 80 is represented schematically by arrow 102 in FIG. 6, and the airflow through suction aperture 84 in fan shroud 54 is represented schematically by arrow 106 in FIG. 4. By positioning vent aperture 82 near the top of baffle 80, hot air that rises in engine compartment 92 may be removed by fan 56. The hot air from radiator 52 and the hot air from internal combustion engine 40 are combined in fan shroud 54, the two streams entering substantially transversely, or non-parallel, to one another as illustrated schematically in FIG. 6. Then, the combined hot air stream is blown from outlet 74 of fan shroud 54 toward baffle 80, forcing the air to escape from radiator compartment 90 of hood 30 via side grill 34 or other vented portions of hood 30, for example. The exhaust airflow is represented schematically by arrow 104 in FIG. 6. According to an exemplary embodiment of the present disclosure, the hot air that is pulled from engine compartment 92 of hood 30 is replaced by cool, ambient air that enters via side grill 34' or other vented portions of hood 30, for example. This cool, ambient air absorbs heat from internal combustion engine 40 to further cool internal combustion engine 40.

The components described above may be designed to optimize cooling of engine compartment 92. For example, the size, shape, and position of vent aperture 82 and suction aperture 84 may be varied to optimize the flow rate of hot air from engine compartment 92. As another example, the rotation speed of fan 56 may be varied. As yet another example, side grill 34 of hood 30 may be designed to optimize the flow of hot air exhausted from radiator compartment 90, and side grill 34' of hood 30 may be designed to optimize the flow of cool, ambient replacement air into engine compartment 92.

The present disclosure may lower the temperature inside engine compartment 92 of hood 30 to protect internal combustion engine 40 and other vehicle components located therein. The present disclosure may also lower the surface temperature of skidder 10, such as external surfaces of hood 30 and surfaces of hood 30 in contact with operator cab 22, which may protect the operator and enhance the operator's comfort inside operator cab 22. In addition, the present disclosure may improve the performance of an air conditioning system for operator cab 22, because the hot air is exhausted from radiator compartment 90 rather than from engine compartment 92 located next to operator cab 22.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

EXAMPLE #1

A test assembly was constructed, including a fan and a baffle, similar to fan 56 and baffle 80 described above. Two fan shrouds (Fan Shroud A and Fan Shroud B) were also constructed, each having a suction aperture, similar to suction aperture 84 of fan shroud 54 described above. The configurations of the suction apertures are described in Table 1 below.

TABLE 1

| Fan Shroud | Location | Length (in) | Width (in) |
|---|---|---|---|
| A | Bottom Wall | 28 | 2 |
| B | Bottom Wall | 28 | 1 |

To compare the Fan Shrouds A and B, the fan was rotated at about 1,500 rpm. Less than 8,700 cubic feet per minute (cfm) of air flowed through the fan with Fan Shroud A, while almost 8,900 cfm of air flowed through the fan with Fan Shroud B. However, over 700 cfm of air flowed through the suction aperture of Fan Shroud A, while less than 400 cfm of air flowed through the suction aperture of Fan Shroud B.

Increasing the fan speed to 1,600 rpm increased the airflow through the fan with Fan Shroud B to almost 9,500 cfm, and also increased the airflow through the suction aperture of Fan Shroud B to above 400 cfm.

EXAMPLE #2

A computer model was constructed, including a baffle, a fan, and a fan shroud having a suction aperture. The suction aperture was formed in the top wall of the fan shroud and had the same dimensions as that of Fan Shroud A (Table 1). Using computational fluid dynamics (CFD) analysis, and based on a fan speed of 1,500 rpm, the computer calculated over 800 cfm of airflow through the suction aperture.

The invention claimed is:

1. A vehicle including:
   a chassis;
   at least one ground engaging mechanism configured to propel the chassis over the ground;
   an engine operatively coupled to the at least one ground engaging mechanism to power propulsion of the chassis;
   a baffle defining a vent aperture; and
   a cooling system separated from the engine by the baffle, the cooling system including:
      at least one heat exchanger;
      a shroud having an outer periphery that defines an opening, an inlet, and an outlet, the outer periphery of the shroud including a suction aperture in communication with the vent aperture of the baffle; and
      a fan received in the opening of the shroud for rotation therein, the fan being configured to draw air into the inlet of the shroud and into the suction aperture of the shroud, and also being configured to discharge air from the outlet of the shroud toward the engine and the baffle.

2. The vehicle of claim 1, further including a duct that extends from the vent aperture in the baffle to the suction aperture in the shroud.

3. The vehicle of claim 1, wherein the outer periphery of the shroud includes a top wall, a bottom wall, and a plurality of side walls, the suction aperture being defined by at least one of the top wall, the bottom wall, and the plurality of side walls.

4. The vehicle of claim 1, wherein the baffle includes a top end, a bottom end, and a plurality of sides, the vent aperture being located near at least one of the top end, the bottom end, and the plurality of sides.

5. The vehicle of claim 1, wherein the heat exchanger includes a radiator coupled to the engine for cooling the engine.

6. A method to ventilate an engine compartment of a vehicle including the steps of:
   (a) providing a vehicle including an engine and at least one heat exchanger;
   (b) directing a first air stream across the heat exchanger to cool the heat exchanger;
   (c) directing a second air stream across the engine to cool the engine, wherein the first air stream flows across the heat exchanger in a first direction and the second air stream flows across the engine in a second direction that is substantially opposite to the first direction;
   (d) combining the first and second air streams to produce a third air stream; and
   (e) exhausting the third air stream from the vehicle.

7. The method of claim 6, wherein step (b) includes rotating a fan to pull the first air stream across the heat exchanger.

8. The method of claim 7, wherein step (c) includes rotating the fan to pull the second air stream across the engine toward the heat exchanger.

9. The method of claim 6, wherein step (d) includes rotating a fan to combine the first and second air streams, the first and second air streams entering the fan in substantially transverse directions.

10. The method of claim 6, further including the step of shielding the third air stream from the engine.

11. A vehicle including:
a chassis;
at least one ground engaging mechanism configured to propel the chassis over the ground;
an engine operatively coupled to the at least one ground engaging mechanism to power propulsion of the chassis;
a heat exchanger coupled to the engine for cooling the engine; and
a fan assembly including:
a first inlet configured to draw air across the heat exchanger and into the fan assembly;
a second inlet configured to draw air across the engine and into the fan assembly; and
an outlet configured to discharge air drawn into the fan assembly through the first and second inlets,
wherein the heat exchanger is positioned upstream of the fan assembly, and the fan assembly is positioned upstream of the engine.

12. The vehicle of claim 11, further including a baffle that separates the engine from the fan assembly.

13. The vehicle of claim 12, further including a duct that extends from the baffle to the second inlet of the fan assembly.

14. The vehicle of claim 11, wherein the first inlet extends substantially transversely to the second inlet.

15. The vehicle of claim 11, wherein the fan assembly includes:
a shroud having an outer periphery that defines an opening, the second inlet being defined by the outer periphery of the shroud; and
a fan received in the opening of the shroud for rotation therein.

16. A vehicle including:
a chassis;
at least one ground engaging mechanism configured to propel the chassis over the ground;
an engine operatively coupled to the at least one ground engaging mechanism to power propulsion of the chassis;
a baffle defining a vent aperture;
a cooling system separated from the engine by the baffle, the cooling system including:
at least one heat exchanger;
a shroud having an outer periphery that defines an opening, an inlet, and an outlet, the outer periphery of the shroud including a suction aperture in communication with the vent aperture of the baffle; and
a fan received in the opening of the shroud for rotation therein, the fan being configured to draw air into the inlet of the shroud and into the suction aperture of the shroud, and also being configured to discharge air from the outlet of the shroud toward the engine and the baffle; and
a hood supported by the chassis and defining a hood compartment, the engine, the baffle, and the cooling system being positioned in the hood compartment.

17. The vehicle of claim 16, wherein the baffle is sealed against the hood to divide the hood compartment into a first hood compartment and a second hood compartment, the engine being positioned in the first hood compartment and the cooling system being positioned in the second hood compartment.

18. The vehicle of claim 17, wherein the hood includes a screen that at least partially defines the second hood compartment.

19. A vehicle including:
a chassis;
at least one ground engaging mechanism configured to propel the chassis over the ground;
an engine operatively coupled to the at least one ground engaging mechanism to power propulsion of the chassis;
a baffle defining a vent aperture;
a cooling system separated from the engine by the baffle, the cooling system including;
at least one heat exchanger;
a shroud having an outer periphery that defines an opening, an inlet, and an outlet, the outer periphery of the shroud including a suction aperture in communication with the vent aperture of the baffle; and
a fan received in the opening of the shroud for rotation therein, the fan being configured to draw air into the inlet of the shroud and into the suction aperture of the shroud, and also being configured to discharge air from the outlet of the shroud toward the engine and the baffle; and
at least one screen positioned between the shroud and the baffle.

* * * * *